J. G. WILKISON.
Velocipede.
No. 64,820.  Patented May 14, 1867.
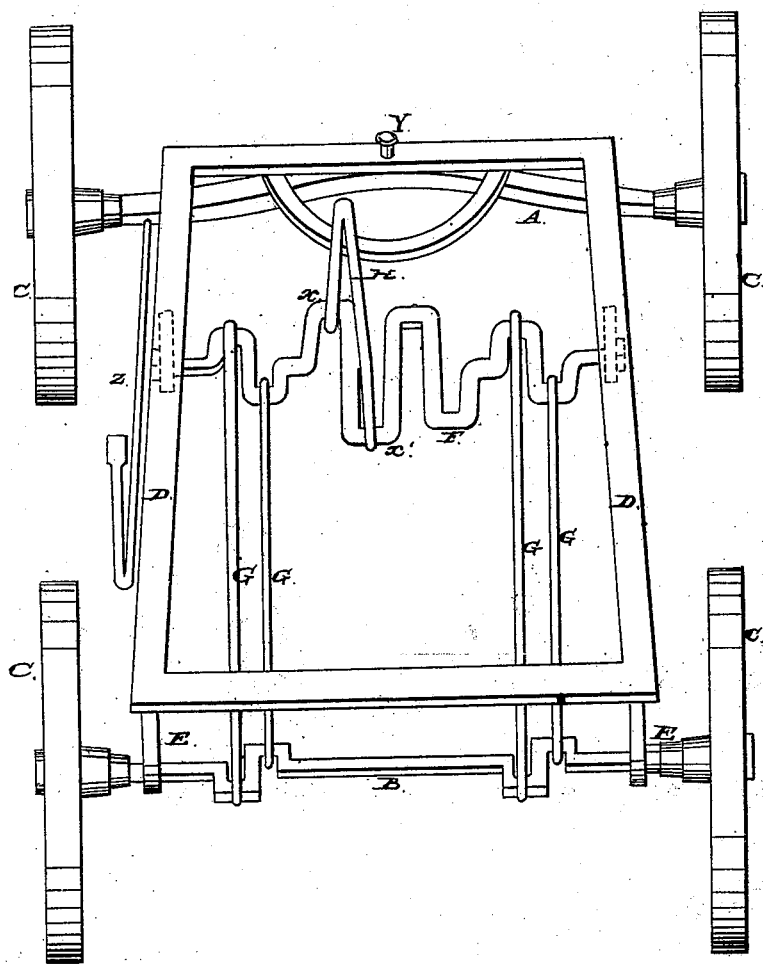
Witnesses:  Inventor:

United States Patent Office.

JOHN G. WILKISON, OF QUINCY, OHIO.

Letters Patent No. 64,820, dated May 14, 1867.

---

IMPROVEMENT IN VEHICLES.

---

*The Schedule referred to in these Letters Patent and making part of the same.*

---

TO ALL WHOM IT MAY CONCERN:

Be it known that I, JOHN G. WILKISON, of Quincy, in the county of Logan, and in the State of Ohio, have invented certain new and useful Improvements in Vehicles, and do hereby declare that the following is a full, clear, and exact description thereof, reference being had to the accompanying drawings, and to the letters of reference marked thereon.

In the annexed drawings, making a part of this specification, A B represent the two axles, which are provided with suitable wheels, C C, for supporting the main portion of the vehicle. The rear axle, B, is a crank-axle, and made in the usual form as such. D represents the frame, upon which the bed or body of the vehicle is placed, and which is secured upon the axle A by means of the pivot $g$, and upon the crank-axle B by means of small uprights E E, which are provided with loops at their lower ends for the said axle to pass through and freely revolve. Near the centre of this frame D is secured a horizontal rocker-shaft, F, by means of small bars, similar to those, E, under the rear end of frame D. This rocker-shaft is so constructed as to form a crank-shaft at each side of the rocking part, and is threaded upon each end for securing it, by means of nuts, to the loops under the frame D. Upon the rocking part of said shaft, $x\ x'$, is placed a divided lever, H, which has one prong thereof connected to the forward, $x$, and the other prong connected to the rear, part, $x'$, of the shaft. Connecting this rocker-shaft to the crank-shaft B are suitable rods of pitmen G G G G, for propelling the vehicle when operated by the lever. It will be seen that the lever H is of a suitable length to extend above the bed of the vehicle, and there be operated by the occupant. The back-and-forward motion of this lever will cause the rocking of the shaft, which causes the revolutions of the rear axle B, and the forward movement of the wagon. The rods G are so placed that when one is drawing forwards the other is pushing backwards, thus causing a continuous turning around of the rear axle. Z represents a guide for shifting the forward wheels and giving direction to the vehicle when in operation.

Having thus fully described my invention, what I claim as new, and desire to secure by Letters Patent, is—

1. The arrangement of the rocker-shaft F with its divided lever H, rods G G, and crank-axle B, with the frame D, in the manner substantially as and for the purposes herein specified.

2. The rocker-shaft F, when constructed in the manner as herein set forth.

In testimony that I claim the foregoing I have hereunto set my hand this 29th day of April, 1867.

JOHN G. WILKISON.

Witnesses:
C. M. ALEXANDER,
J. M. MASON.